(12) United States Patent
Uesugi et al.

(10) Patent No.: US 6,259,721 B1
(45) Date of Patent: Jul. 10, 2001

(54) RADIO COMMUNICATION EQUIPMENT USING ALGORITHM DIVERSITY

(75) Inventors: Mitsuru Uesugi; Osamu Kato, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/091,836

(22) PCT Filed: Nov. 13, 1997

(86) PCT No.: PCT/JP97/04133

§ 371 Date: Jun. 30, 1998

§ 102(e) Date: Jun. 30, 1998

(87) PCT Pub. No.: WO98/21848

PCT Pub. Date: May 22, 1998

(30) Foreign Application Priority Data

Nov. 14, 1996 (JP) .................................................. 8-316898

(51) Int. Cl.[7] .................................................. H04B 15/00
(52) U.S. Cl. .......................... 375/130; 375/147; 375/148; 375/347; 370/335; 370/441; 455/135; 455/277.2
(58) Field of Search ..................................... 375/130, 147, 375/148, 347, 350, 229; 455/132, 133, 134, 135, 276.1, 277.1, 277.2; 370/335, 342, 441, 479

(56) References Cited

U.S. PATENT DOCUMENTS

| 5,204,979 | 4/1993 | Schenkyr et al. . | |
|---|---|---|---|
| 5,369,801 | 11/1994 | Smith . | |
| 5,446,922 | 8/1995 | Siwiak et al. . | |
| 5,490,165 | * | 2/1996 | Blakeney, II et al. ................ 375/205 |
| 5,535,248 | * | 7/1996 | Kurokami ............................ 375/324 |
| 5,684,793 | 11/1997 | Kiema et al. . | |
| 5,859,840 | * | 1/1999 | Tiedemann, Jr. et al. ........... 370/355 |
| 5,903,550 | * | 5/1999 | Spock ................................... 370/335 |
| 5,933,787 | * | 8/1999 | Gilhousen et al. .................. 455/562 |
| 6,028,901 | * | 2/2000 | Huynh et al. ........................ 375/350 |
| 6,052,405 | * | 5/1999 | Nakano ................................ 375/200 |
| 6,058,138 | * | 1/1999 | Fukumasa et al. .................. 375/208 |

* cited by examiner

Primary Examiner—Stephen Chin
Assistant Examiner—Dac V. Ha
(74) Attorney, Agent, or Firm—Greenblum & Bernstein P.L.C.

(57) ABSTRACT

The present invention is characterized by that, at a reception section of a base station in a CDMA system including a reception antenna, a radio section and the number of demodulators corresponding to the number of users where spreading codes of a plurality of spreading factors are available, an algorithm diversity controller and a selector are prepared, information concerning spreading factors of spreading codes utilized by users and others are applied to the algorithm diversity controller, algorithm diversity controller instructs the number of demodulators prepared corresponding to the number of users and the selector, and when signals transmitted by a user utilizing a spreading code of a low spreading factor, i.e. signals with high symbol rate, are received, by demodulating signals with different reception methods or different parameters at demodulators leftover because of the low spreading factor, the demodulated signals of the best quality are selected.

18 Claims, 9 Drawing Sheets

FIG. 9

RADIO COMMUNICATION EQUIPMENT USING ALGORITHM DIVERSITY

TECHNICAL FIELD

The present invention relates to a radio communication apparatus using algorithm diversity used in a communication system such as CDMA (Code Division Multiple Access) and others.

BACKGROUND ART

In a CDMA system, since information signals for a user are spread with a spreading code assigned for each user, the user is identified by the spreading code. That makes it possible to multiple signals of a plurality of users in the same frequency band, which results in a high efficiency in frequency utilization.

In a conventional base station in a CDMA system, it is possible to transmit information signals spread with spreading codes of different spreading factors. In such CDMA system, the number of users is the largest in the case where all users transmit information signals spread with spreading codes of the highest spreading factor, which means the information signals have the smallest symbol rate.

For instance, by making a spreading factor half, the symbol rate becomes twice, and two spreading codes of the lowest spreading factor are supposed to be consumed because of the orthogonality in codes. In other words, the total channel capacity of transmitted information does not change by combing any spreading factors.

On the other hand, since a demodulator is necessary for each user not depending on spreading factors of spreading codes, taking account into the case where all users communicate using the lowest symbol rate, the number of demodulators needed in this case are prepared. Accordingly, in the case where some users utilize spreading codes of different spreading factors, it is possible to demodulate the signals of all users, however some modulators are leftover.

Figure 1:
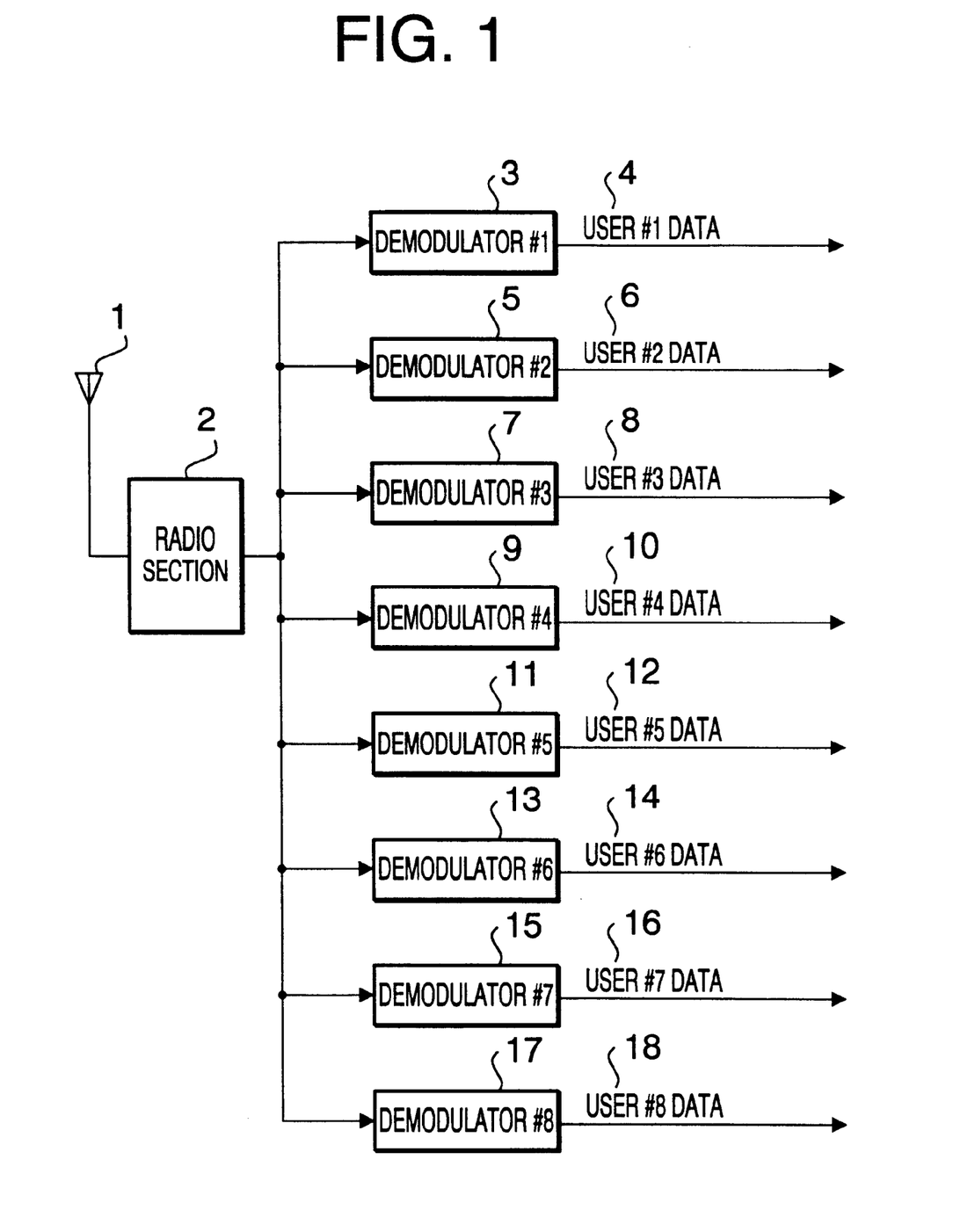
FIG. 1 is a schematic configuration diagram illustrating a conventional reception section at a base station in a CDMA system.
Figure 2:
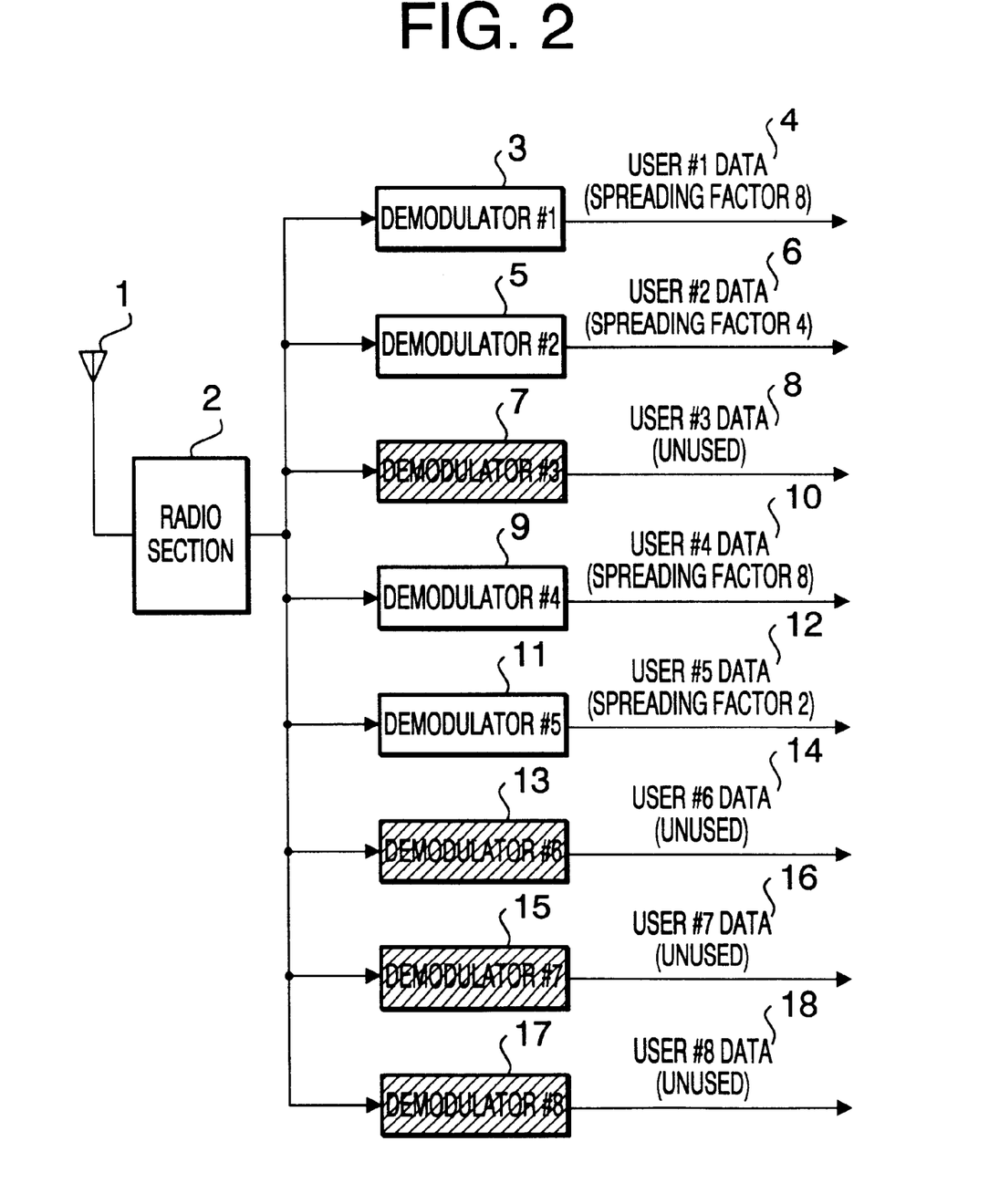
FIG. 2 is a diagram to explain operations at a conventional reception section at a base station in a CDMA system.

FIG. 1 is a block diagram illustrating a schematic configuration of a conventional reception section at a base station in a CDMA system. And, FIG. 2 is a diagram to explain operations in the base station.

In FIG. 1, a reception section at a base station in CDMA system are primarily composed of reception antenna 1, radio section 2, and first through eighth demodulators 3, 5, 7, 9, 11, 13, 15 and 17. Data for each user are extracted from each demodulator above. For instance, user data 4 of first user are extract from first demodulator 3. In the same way, second through eighth user data 6, 8, 10, 12, 14, 16, and 18 are extracted from second through eighth demodulators 5, 7, 9, 11, 13, 15 and 17 respectively. In this case, the highest spreading factor is assumed 8.

The outline of operations of a reception section at a base station in a CDMA system is explained using FIG. 1. A reception signal received at reception antenna 1 is converted into a baseband signal at radio section 2. A user signal for a different user is extracted at either of first through eighth demodulators #1 through #8 (3, 5, 7, 9, 11, 13, 15 and 17 ) to obtain first through eighth user data #1 through #8 (4, 6, 8, 10, 12, 14, 16, and 18) respectively.

In this case, the maximum allowable user number is eight. When eight users all transmit signals using spreading codes of spreading factor 8, first through eighth demodulators #1 through #8 are all used respectively to demodulate data of first through eighth users #1 through #8. However, in the case where some users utilize spreading codes of different spreading factors, the number of used spreading codes differ and so does the information capacity. For instance, a user utilizing a spreading code of spreading factor 4 can transmit an information capacity twice than a user utilizing a spreading code of spreading factor 8. However it means the user consumes two spreading codes of spreading factor 8. Similarly, a user utilizing a spreading code of spreading factor 2 can transmit an information capacity four times than a user utilizing a spreading code of spreading factor 8. However it means the user consumes four spreading codes of spreading factor 8.

FIG. 2 is a diagram illustrating the case where users utilize spreading codes of different spreading factors. In FIG. 2, second user #2 utilizes a spreading code of spreading factor 4, which means the user utilizes two spreading codes of spreading factor 8. And, fifth user #5 utilizes a spreading code of spreading factor 2, which means the user utilizes four spreading codes of spreading factor 8. Because of it, the allowable user number is four. Accordingly, data of first user #1, data of second user #2, data of fourth user #4 and data of fifth user #5 are respectively demodulated at first demodulator #1, second demodulator #2, fourth demodulator #4 and fifth demodulator #5. However, four demodulators; third demodulator #3, sixth demodulator #6, seventh demodulator #7 and eighth demodulator # 8; are leftover (shadow parts in FIG. 2 )

In communications in a CDMA system, in the case of transmitting signals using spreading codes of different spreading factors, the communication quality of signals of a user utilizing a spreading code of low spreading factor is easy to deteriorate against delayed waves especially because the spreading gain is small. To compensate the deterioration in communication quality against delayed waves, it is necessary to increase transmission power, which brings the problems that interference against other users increases and the capacity decreases.

And, because the most appropriate demodulation method and parameter differ depending on the line conditions and others such as fading pitch and profile of delayed versions, it is difficult to assume the most appropriate demodulation method and parameter for various line conditions, for instance, what demodulation method or parameter is useful for what line condition, and so on.

DISCLOSURE OF INVENTION

The purpose of the present invention is achieved by a communication apparatus using algorithm diversity comprising a recognizing section for recognizing the status of used spreading factors of spreading codes and a control section for controlling to demodulate data with spreading code of relatively low spreading factor at a leftover demodulator on the basis of the status of used spreading factors.

And the purpose of the present invention is achieved by a communication apparatus using algorithm diversity comprising a detecting section for detecting the quality of reception data and a control section for controlling to demodulate data of relatively low quality at a leftover demodulator on the basis of the result of quality.

BEST MODE FOR CARRYING OUT THE INVENTION

In a CDMA system, according to assuming channels of the case where all users utilize spreading codes of the highest spreading factor, the number of demodulators corresponding to the number of the users are prepared at a base station. However in the case where a user utilizes a spreading code of low spreading factor, the number of users decreases because a plurality of spreading codes of high spreading factor is consumed, as mentioned previously. Some modulators are leftover in this case because one demodulator are used to demodulate signals for one user whether a spreading code factor is high or low.

In the present invention, by using these leftover demodulators effectively, executing a plurality of demodulation methods with different algorithm or different parameters, and selecting the best demodulation results, the reception quality is improved. This method is called algorithm diversity.

And, in the case where spreading codes of same spreading factor are used, when a few users communicate concurrently, some demodulators are also leftover. In this case, it is possible to select a user with the worst quality and execute the above algorithm diversity primarily to the user.

In addition, this technique is applicable for not only CDMA system but also TDMA (Time Division Multiple Access) system, FDMA (Frequency Division Multiple Access) system and others.

Namely, the present invention is characterized by that, at a reception section of a base station in a CDMA system comprising a reception antenna, a radio section and the number of demodulators corresponding to the number of users where spreading codes of a plurality of spreading factors are available, an algorithm diversity controller and a selector are prepared, information concerning spreading factors of spreading codes utilized by users and others are provided into the algorithm diversity controller, algorithm diversity controller instructs the number of demodulators prepared corresponding to the number of users and the selector, and when signals transmitted by a user utilizing a spreading code of a low spreading factor, i.e. signals with high symbol rate, are received, by demodulating signals with different reception methods or different parameters at demodulators leftover because of the low spreading factor, the demodulated signals of the best quality are selected.

According to it, it is possible to improve the quality of user signal without installing optional hardware. Further, the transmission power can be decreased, which permits to improve the quality of whole system.

And, the present invention is characterized by that, at a reception section of a base station in a CDMA system comprising a reception antenna, a radio section and the number of demodulators corresponding to the number of users where spreading codes of a plurality of spreading factors are available, an algorithm diversity controller, a selector and a quality selector are prepared, superiority or inferiority of the quality of user signals are detected at the quality selector and provided into the algorithm diversity controller, the algorithm diversity controller instructs the number of demodulators prepared corresponding to the number of users and the selector, and when the spreading factors are the same, by demodulating user signals of low quality with different demodulation methods or different parameters at leftover demodulators, signals of better quality are selected.

According to it, in the case where spreading codes of the same spreading factor are used for all user, depending on the needs(under the capacity), by demodulating signals assumed of low quality with a different modulation method or a different parameter at a leftover demodulator, the quality is improved.

The embodiments of the present invention are explained in details with reference to attached drawings in the following.

(First Embodiment)

In the first embodiment, the case where a base station processes data using spreading codes of different spreading factors is explained.

Figure 3:
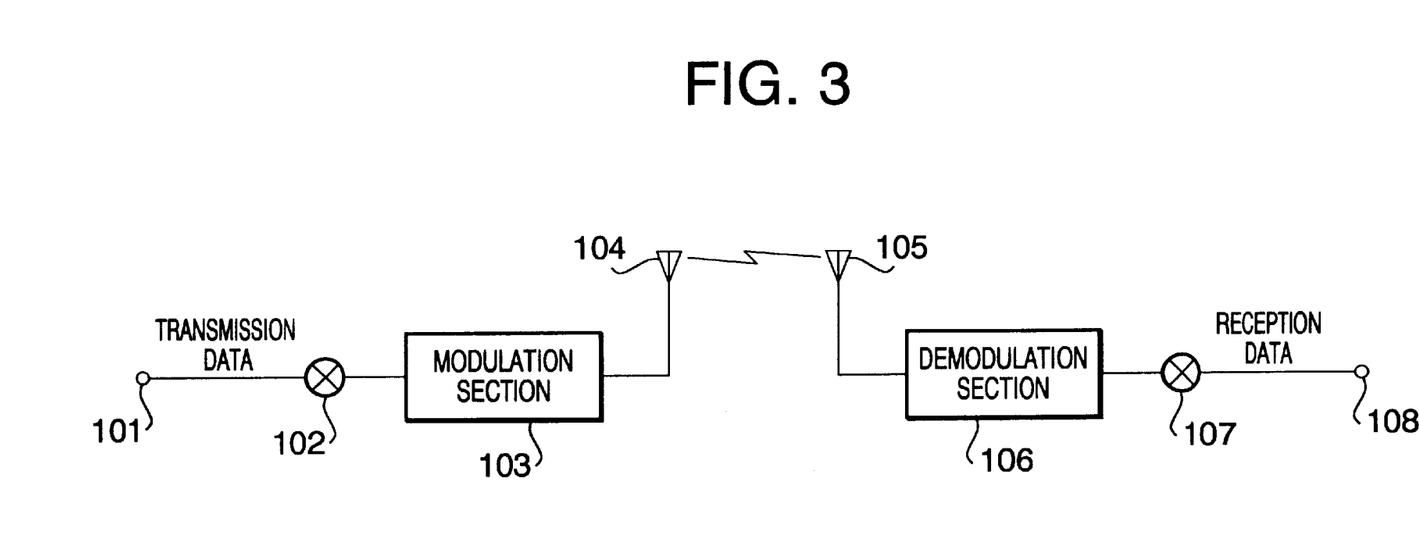
FIG. 3 is a schematic configuration diagram illustrating a communication system using a communication apparatus of the present invention.

FIG. 3 is a schematic configuration diagram illustrating the CDMA system used in the embodiments of the present invention. In this system, the transmission side comprises spreading section 102 for code spreading transmission data 101, modulating section 103 for modulating the code spread data and transmission antenna for transmitting the modulated signals. And, in this system, the reception side comprises reception antenna 105 for receiving transmitted signals, demodulating section 106 for demodulating the reception signals and despreading section 107 for despreading the demodulated data with a spreading code.

Next, operations in the CDMA system having the constitution described above are explained. First, transmission data 101 are spread with a certain spreading code at spreading section 102. Then, the data spread in this way are provided into modulation section 103 and modulated by a modulation method, for instance BPSK (Binary Phase Shift Keying). This modulated signal is radiated from transmission antenna 104.

A transmitted signal is received at reception antenna 105. The reception signal is demodulated at demodulating section 106 and despread with the spreading code described above at despreading section 107 to obtain reception data 108. In the system constituted as described above, communications between a base station and a mobile station are executed.

Figure 4:
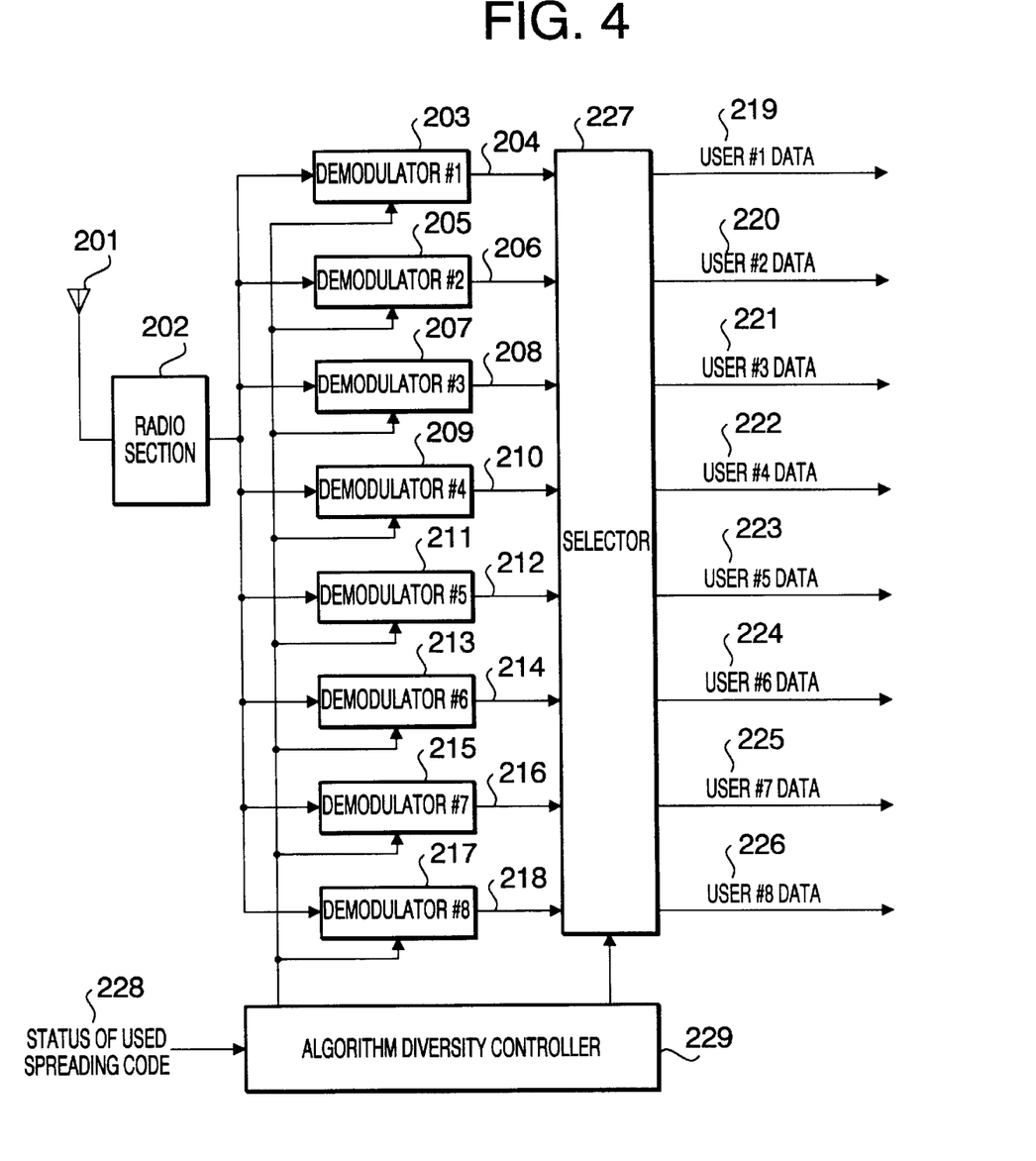
FIG. 4 is a schematic configuration diagram illustrating a reception section at a base station in the first embodiment of the present invention.
Figure 5:
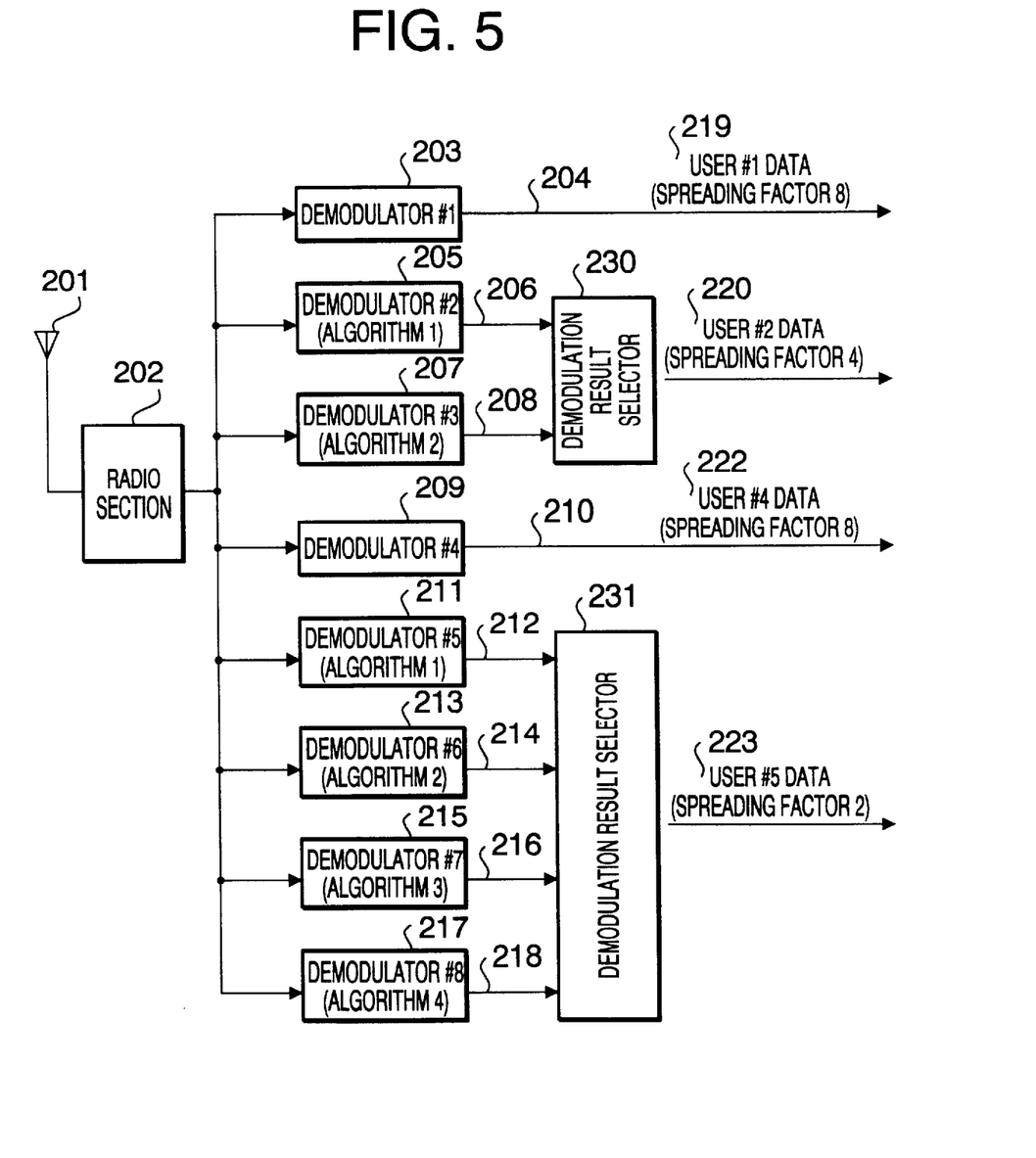
FIG. 5 is a diagram to explain operations at a reception section at a base station in the first embodiment of the present invention.

FIG. 4 is a block diagram illustrating a schematic configuration of a reception section at a base station in a CDMA system, and FIG. 5 is a diagram to explain the operations. In FIG. 4, the reception section of the base station primarily comprises reception antenna 201 for receiving a code spread signal, radio section 202 for converting the reception signal into a baseband signal, first through eighth demodulators #1 through #8 (203, 205, 207, 209, 211, 213, 215 and 217), selector 227 for selecting modulated data and algorithm diversity controller 229.

First through eighth modulators output respectively first through eighth demodulation results 204, 206, 208, 210, 212, 214, 216 and 218 to input into selector 227. And, modulation results are output from selector 227 as first through eighth user data #1 through #8 (219 through 226) respectively. In addition, in this embodiment, the highest spreading factor of a spreading code is assumed 8.

The outline of operations at the reception section at the base station described above is explained using FIG. 4. A reception signal received at reception antenna 201 is converted into a baseband signal at radio section 202. A user signal for a different user is extracted at either of first through eighth demodulators #1 through #8 respectively to obtain first through eighth demodulation results.

In this case, the maximum allowable user number is eight. When eight users all transmit signals using spreading codes of spreading factor 8, first through eighth demodulators #1 through #8 are all used respectively to demodulate first through eighth demodulation results to obtain data 219 through 226 of first through eighth users #1 through #8 with passed through selector 227.

However, in the case where some users utilize spreading codes of different spreading factors, the number of used spreading codes differ and so does the information capacity. For instance, a user utilizing a spreading code of spreading factor 4 can transmit an information capacity twice than a user utilizing a spreading code of spreading factor 8. However it means the user consumes two spreading codes of spreading factor 8. Similarly, a user utilizing a spreading code of spreading factor 2 can transmit an information capacity four times than a user utilizing a spreading code of spreading factor 8. However it means the user consumes four spreading codes of spreading factor 8.

FIG. 5 is a diagram illustrating the case where users utilize spreading codes of different spreading factors. In FIG. 5, second user #2 utilizes a spreading code of spreading factor 4, which means the user utilizes two spreading codes of spreading factor 8. And, fifth user #5 utilizes a spreading code of spreading factor 2, which means the user utilizes four spreading codes of spreading factor 8. Because of it, the allowable user number is four. Accordingly, data of first user #1, data of second user #2, data of fourth user #4 and data of fifth user #5 are respectively demodulated at first demodulator #1, second demodulator #2, fourth demodulator #4 and fifth demodulator #5. However, four demodulators; third modulator #3, sixth modulator #6, seventh modulator #6 and eighth modulator #8; are leftover.

In communicating signals using spreading codes of low spreading factors (data of user #2 or #5), the transmitted information capacity is increased because of the high symbol rates, however the quality is easy to deteriorate because of small suppression effect against interference in codes result from delayed versions. To compensate the quality deterioration, data from user #2 are demodulated at third demodulator #3 and data from user #5 are demodulated at sixth through eighth demodulators #6 through #8.

At this time, as a demodulation to compensate (demodulation by third demodulator #3, and sixth through eighth demodulators #6 through #8), a demodulation method, parameter and others different from that of the original one (demodulation by second demodulator #2 and fifth demodulator #5) are applied. Each modulation method is selected to obtain the superiority in demodulation results depending on line conditions. For instance, examples of algorithms to combine and assumed effects are shown in the following table.

TABLE

| Algorithm to combine | Assumed Effect |
| --- | --- |
| Detection Method (Synchronizing Detection and Delay Detection) | Depending on the rate of line fluctuations, more profitable one is selected (In the case of fast, Synchronizing detection, in the case of slow, Delay Detection) |
| Algorithm of different finger assign method (Selection method especially for close pass level) | An assign method that gives the best SIR after Rake combine is selected (To suppress interference signals in same gain of desired signals, etc.) |
| Algorithm of different line assuming method (Degree of Interpolation etc.) | Depending on the rate of line fluctuations, the most profitable interpolation method is selected sequentially |
| Path selection method of Viterbi decoding (Selection logic of close path metrics) | The best result of Viterbi decoding is selected |
| Random access (method of Rake combine, etc. in the case where a plurality of accesses are occurred at close timing) | Through put in random access can be improved |
| Algorithm of different AFC method (Detection method of frequency offset at a demodulator) | Having better AFC in a baseband signal (the most profitable method under line conditions at that time) is selected |
| Sector selection method and Handover between sectors | The most profitable sector except the object one can be selected (Destination sector for a handover in a handover between sectors is selected from the selection results |

Next, operations of the case illustrated in FIG. 5 are explained. Demodulation result selector 230 assumes the qualities of demodulation result 206 of second demodulator #2 and demodulation result 208 of third demodulator #3 to select better one. As a selection standard, following standards are available with alone or combined; phase likelihood, amplitude information, error information after demodulation, result of error correction, error number of synchronization signals and others.

In this way, by executing the most appropriate demodulation for various line conditions, it is possible to make the quality higher than the case of receiving with single demodulation method or parameter.

And, data 233 of fifth user #5 are also demodulated at sixth through eighth demodulators #6 through #8 each with a different demodulation method or a parameter along with fifth demodulator #5 to obtain demodulation results, then demodulation result selector 231 selects one of the best quality from those results. The selection standards are same as those in the above case. According to the way described above, it is possible to demodulate data using a spreading code of low spreading factor having large deterioration in quality with more modulation methods to obtain a plurality of modulation results, and to select the best one from those results, which allows to obtain the quality almost equal to that of the demodulation result of data using a spreading code of a different spreading factor.

In addition, FIG. 5 is a view for explaining the operations. The actual apparatus has the same constitution as that in FIG. 4, and can correspond to the case of processing the combination of spreading codes of any spreading factors.

Figure 6:
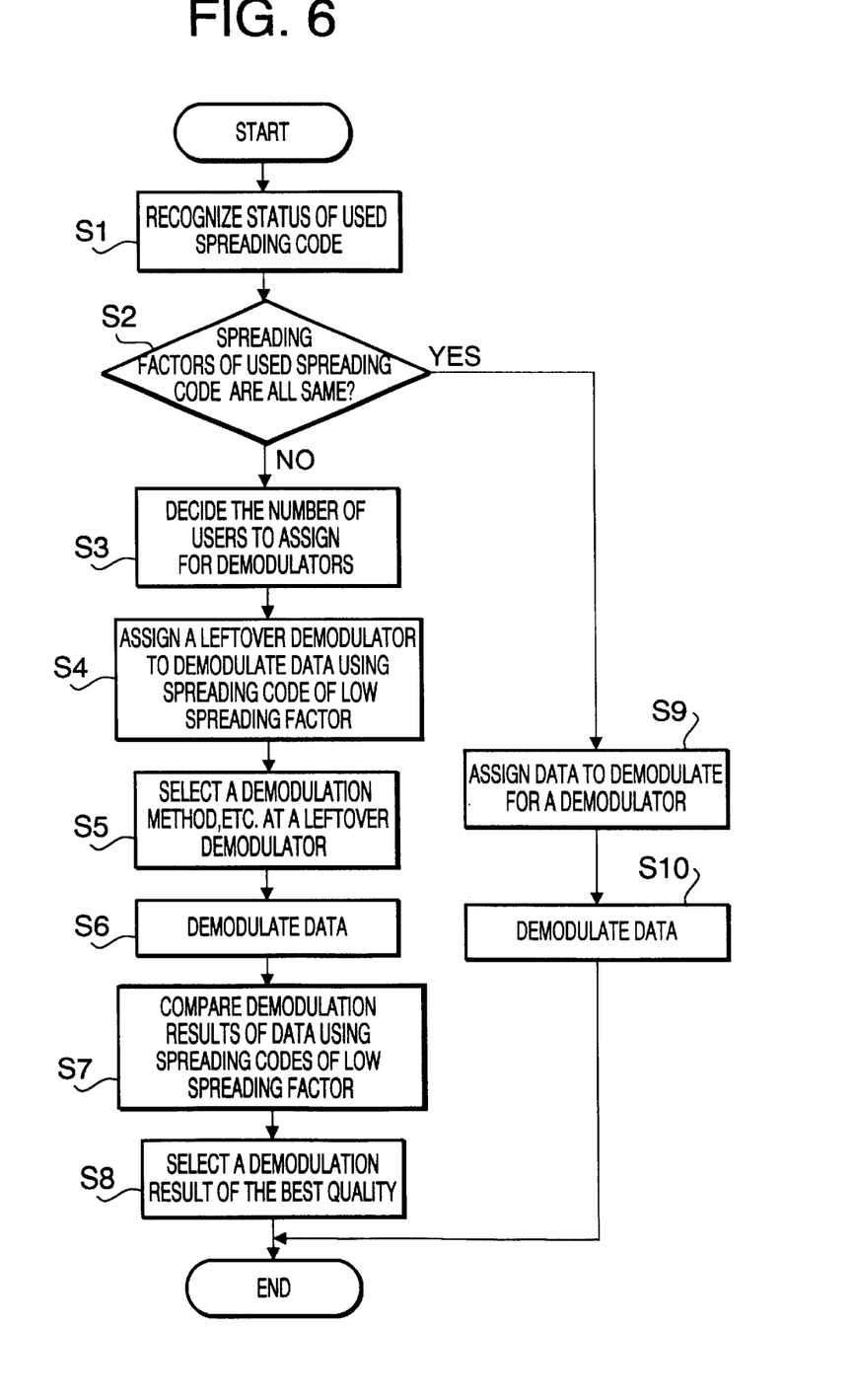
FIG. 6 is a flow chart to explain operations of the first embodiment of the present invention.

Next, operations of the embodiment of the present invention is explained with the flow chart illustrated in FIG. 6. First, information concerning that a spreading code of what spreading factor is how used and others is provided into algorithm diversity controller 229 from a controller (not illustrated) for assigning a user as a spreading code use status signal 228, then algorithm diversity controller 229 recognizes the status of used spreading code (S1).

Next, whether the spreading factors of used spreading codes are all same or not is decided at algorithm diversity controller 229 (S2). In the case where the spreading factors of used spreading codes are different, the number of users assigned for actually available demodulators are decided (S3). For instance, in the base station illustrated in FIG. 4, the number of demodulators is eight and the number of users is four.

Next, at algorithm diversity controller 229, leftover demodulators are assigned to modulate data using spreading codes of low spreading factors (S4). Further, demodulation methods for the leftover demodulators are selected (S5), and each data are demodulated at each demodulator (S6). In this case, a modulation method different from original one is selected depending on the line conditions to obtain the superiority in the demodulation results.

Next, at data demodulation result selectors 230 and 231, data demodulated at a plurality of demodulators, i.e. modulation results of data using spreading codes of low spreading factors are compared (S7) and the modulation result of the best quality is selected from the demodulation results (S8).

On contrast, in the case where the spreading factors of used spreading codes are all same, at algorithm diversity controller 229, data to demodulate are assigned for demodulators (S9) and data are demodulated at the demodulators (S10).

In this way, at the communication apparatus in the embodiment, the leftover demodulators are used effectively, a plurality of demodulation are processed with different algorithms or parameters then the best demodulation result is selected. That permits to improve the reception quality.
(Second Embodiment)

In the second embodiment, the case where a base station processes data using spreading codes of same spreading factors is explained.

Figure 7:
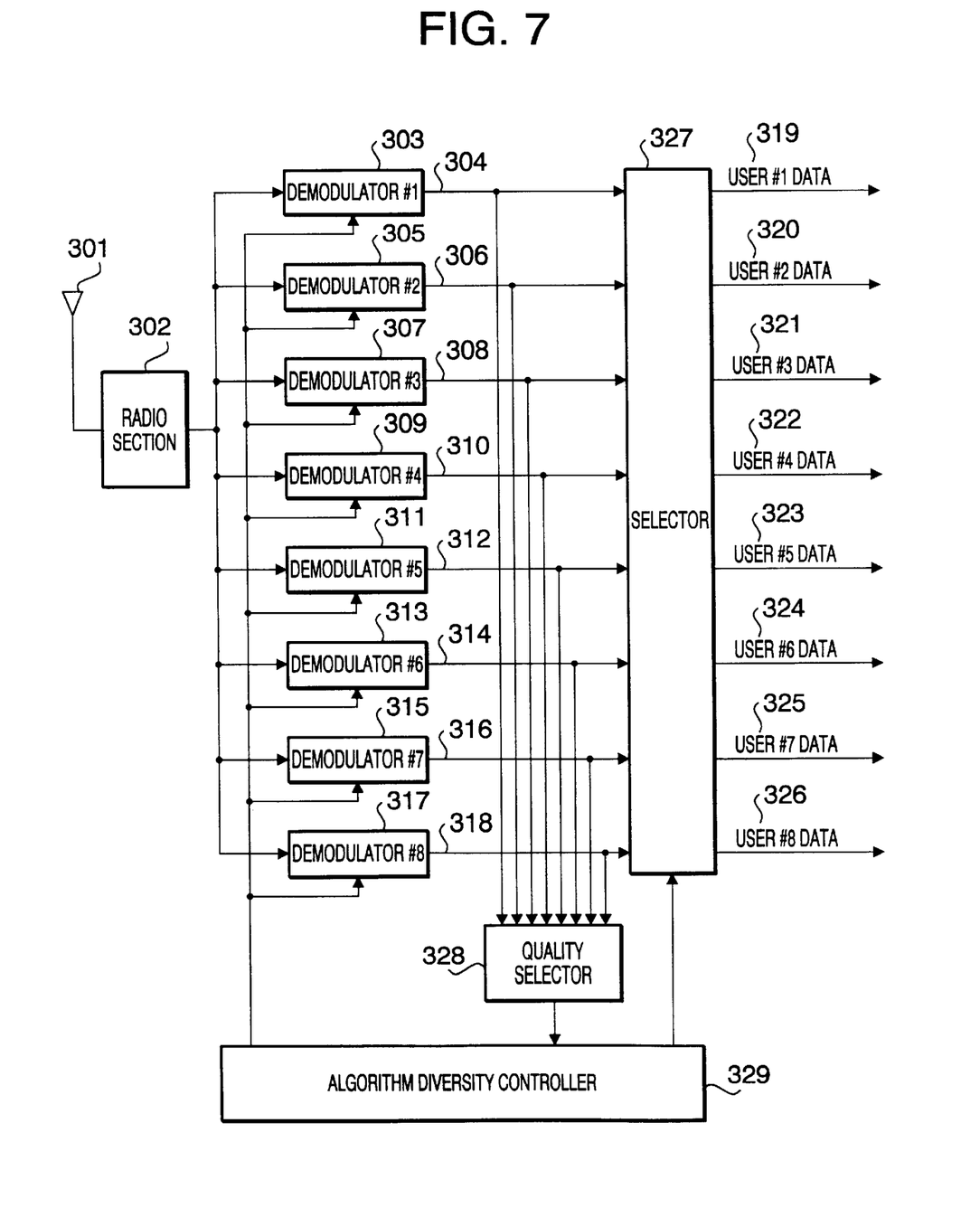
FIG. 7 is a schematic configuration diagram illustrating a reception section at a base station in the second embodiment of the present invention.
Figure 8:
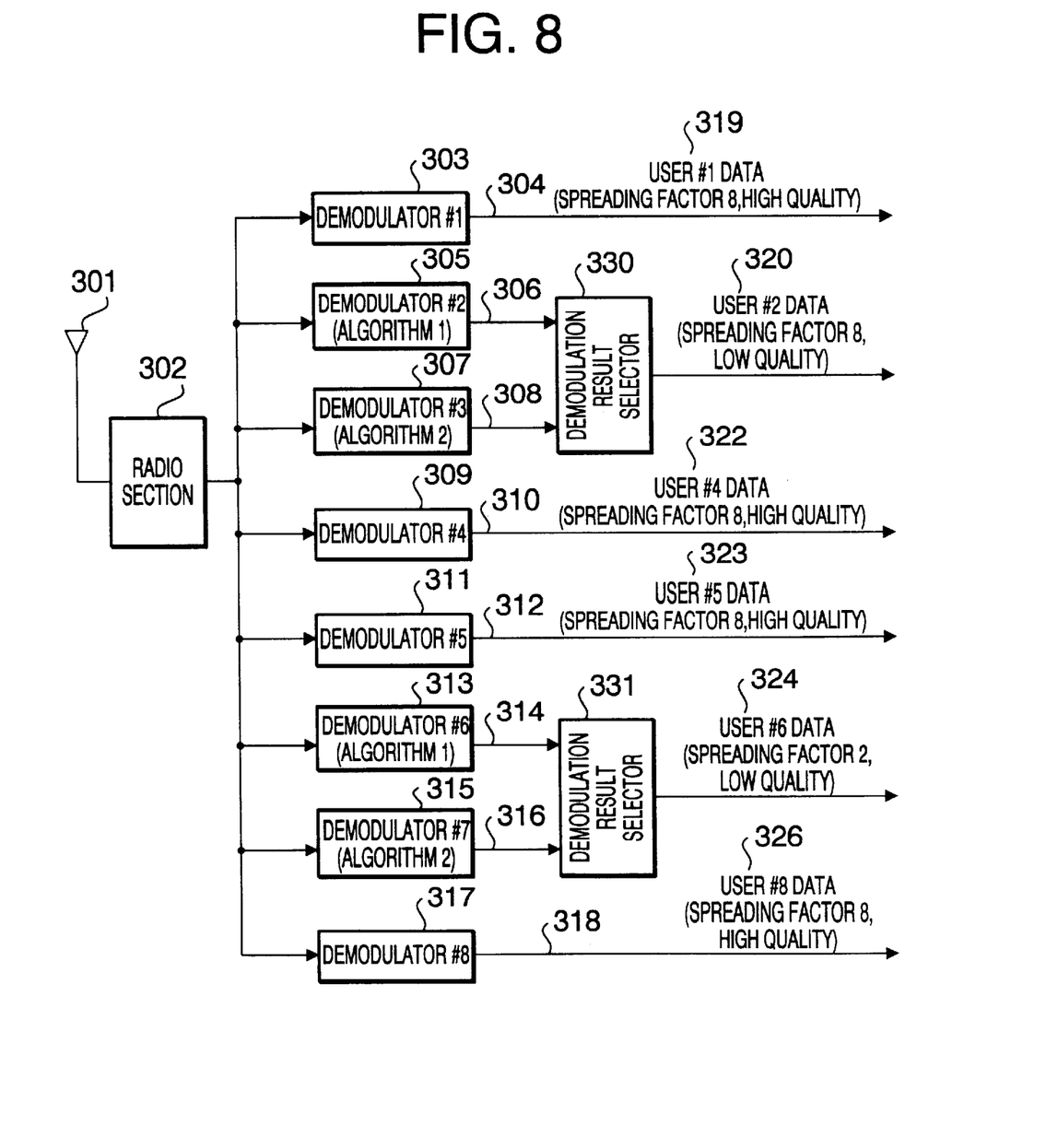
FIG. 8 is a diagram to explain operations at a reception section at a base station in the second embodiment of the present invention.

FIG. 7 is a block diagram illustrating a schematic configuration of a reception section at a base station in a CDMA system, and FIG. 8 is a diagram to explain the operations. In FIG. 7, the reception section at the base station primarily comprises reception antenna 301 for receiving a code spread signal, radio section 302 for converting the reception signal into a baseband signal, first through eighth demodulators #1 through #8 (303, 305, 307, 309, 311, 313, 315 and 317), selector 327 for selecting modulated data, quality selector 328 for detecting superiority or inferiority in signal quality and algorithm diversity controller 329.

First through eighth modulators output respectively first through eighth demodulation results 304, 306, 308, 310, 312, 314, 316 and 318 to input into selector 327 and quality selector 328. And, each modulation result is output from selector 327 as either of first through eighth user data #1 through #8 (319 through 326). In addition, in this embodiment, the highest spreading factor of spreading codes is assumed 8.

The outline of operations at the reception section at the base station described above are explained using FIG. 7. A reception signal received at reception antenna 301 is converted into a baseband signal at radio section 302. A user signal for a different user is extracted at either of first through eighth demodulators #1 through #8 respectively to obtain first through eighth demodulation results.

In this case, the maximum allowable user number is eight. When eight users all transmit signals using spreading codes of spreading factor 8, first through eighth demodulators #1 through #8 are all used respectively to demodulate first through eighth demodulation results to obtain data 319 through 326 of first through eighth users #1 through #8 respectively with passed through selector 327.

The base station illustrated in FIG. 7 has the capacity to accommodate maximum eight users, however, when fewer than eight users are communicating, some demodulators are leftover. FIG. 8 illustrates the case where six users are transmitting signals, six users are assumed to be each assigned for first demodulator #1, second demodulator #2, fourth demodulator #4, fifth demodulator #5, sixth demodulator #6 and eighth demodulator #8. In this case, two demodulators; third demodulator #3 and seventh demodulator #7; are leftover.

FIG. 8 illustrates the case where the number of users are fewer than the number of demodulators prepared at a base station. FIG. 8 illustrates the case where the qualities of data of second user #2 and sixth user #6 are low. Accordingly, to improve (compensate) the qualities of data of second user #2 and sixth user #6, the data of second user #2 is demodulated at third demodulator #3 and the data of sixth user #6 is demodulated at seventh demodulator #7.

At this time, as a demodulation to compensate (demodulation by third demodulator #3 and seventh demodulator #7), a demodulation method, parameter and others different from that in the demodulation by second demodulator #2 and sixth demodulator #6 are applied. Each modulation method is selected to obtain the superiority in demodulation results depending on line conditions in same way as that in the first embodiment.

Next, operations of the case shown in FIG. 8 are explained. Demodulation result selector 330 assumes the qualities of demodulation result 306 of second demodulator #2 and demodulation result 308 of third demodulator #3 to select better one. Demodulation result selector 331 assumes the qualities of demodulation result 314 of sixth demodulator #6 and demodulation result 316 of seventh demodulator #7 to select better one. As a selection standard, following standards are available with alone or combined; phase likelihood, amplitude information, error information after demodulation, result of error correction, error number of synchronization signal and others.

In this way, by executing the most appropriate demodulation for various line conditions, it is possible to make the quality higher than the case of receiving with a single demodulation method or parameter. According to the way described above, it is possible to demodulate data of low quality with more modulation methods to obtain a plurality of modulation results and to select the best one from those results, which allows to obtain the quality almost equal to that of the demodulation result of data of comparable high quality.

In addition, FIG. 8 is a view for explaining the operations. The actual apparatus has the same constitution as that in FIG. 7, and can corresponds to the case of processing the combination of data of any quality.

Figure 9:
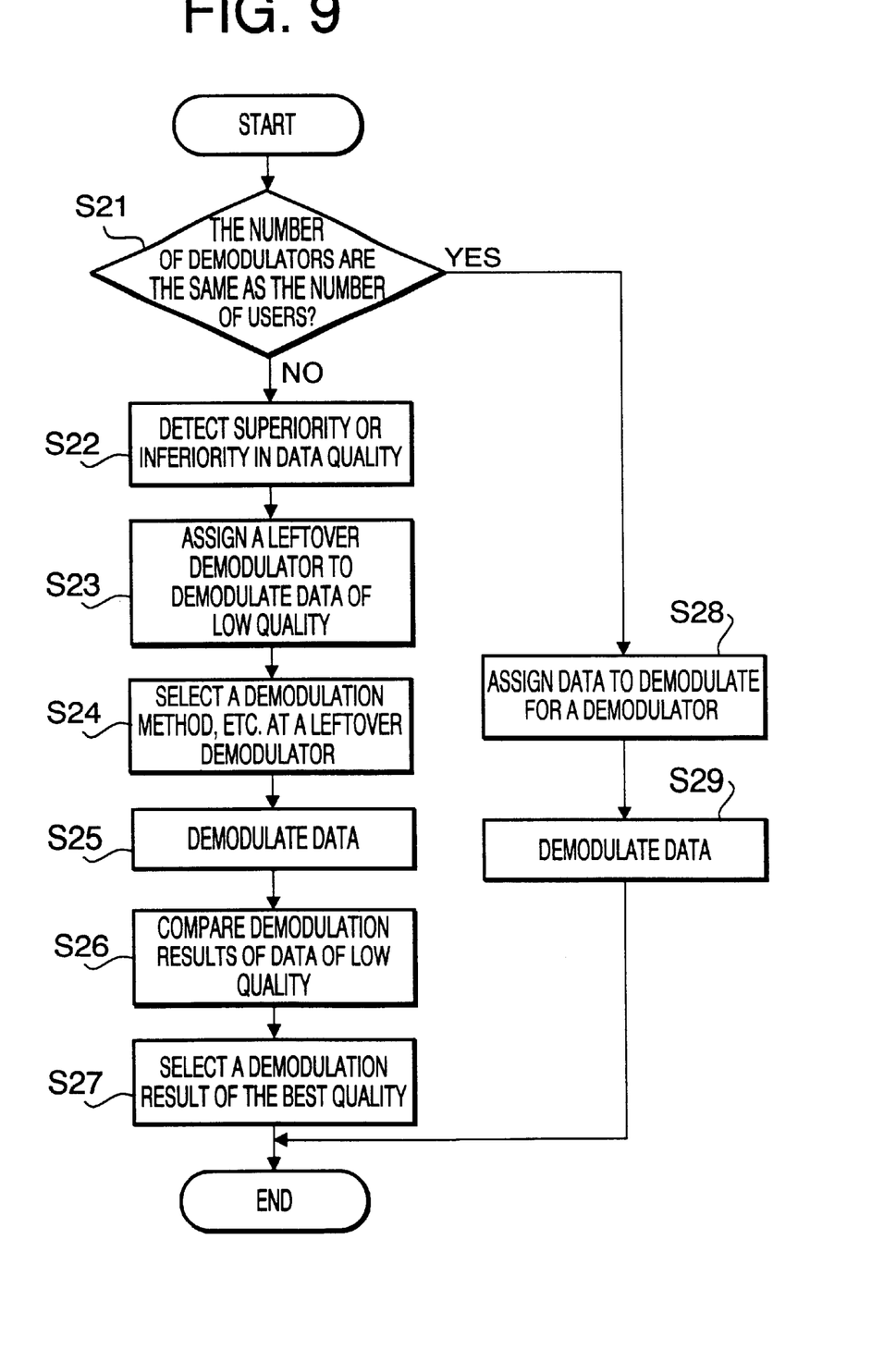
FIG. 9 is a flow chart to explain operations of the second embodiment of the present invention.

Next, operations of the embodiment of the present invention is explained with the flow chart illustrated in FIG. 9. First, at algorithm diversity controller 329, whether the number of users is the same as the number of demodulators prepared at the base station is decided (S21). Next, at quality selector, superiority or inferiority in the quality of reception data is detected (S22).

Next, the leftover demodulators are assigned to demodulate data of low quality (S23). For instance, in FIG. 7, the data qualities of user #2 and user #6 are low, and third demodulator #3 and seventh demodulator #7 are leftover. Therefore, third demodulator #3 is assigned to demodulate data of user #2 and seventh demodulator #7 is assigned to demodulate data of user #6.

Next, at algorithm diversity controller 329, a demodulation method and others at the leftover demodulators are selected (S24) and data are demodulated at each demodulator (S25). In this case, a modulation method different from original one is selected depending on the line conditions to obtain the superiority in the demodulation results in the same way as first embodiment.

Next, at data demodulation result selectors 330 and 331, data demodulated at a plurality of demodulators, i.e. modulation results of data of low quality are compared (S26), and the modulation result of the best quality among the demodulation results is selected (27).

On contrast, in the case where the number of users is the same as the number of demodulators prepared at the base station, at algorithm diversity controller 329, data to demodulate is assigned for a demodulator (S28), and the data is demodulated at the demodulator (S29).

In this way, at the communication apparatus in the embodiment of the present invention, in the case where user signals processed all have spreading codes of the same spreading factor, depending of the needs, since signals supposed of low quality is demodulated at a leftover demodulator by demodulation with different demodulation method or parameter, the quality can be improved.

The embodiment of the present invention is not limited to only CDMA system, but also applied for TDMA system and FDMA system. And, it is possible to combine this embodiment of the present invention and the first embodiment of the present invention to carry out.

The present invention is not limited by the first embodiment and second embodiment of the present invention, but can be modified variously to carry out. Namely, it is possible to change the number of demodulators prepared at a base station, the allowable user number, spreading factor to use, modulation method of data and others properly.

As described above, at the communication apparatus using the algorithm diversity of the present invention, without increases of hardware, leftover demodulators are used effectively and the reception quality of a specific user is improved. That provides the excellent effect that the quality of the whole system can be improved.

INDUSTRIAL APPLICABILITY

The communication apparatus using the algorithm diversity of the present invention is useful in a data communication field using radio communication equipment such as mobile telephone and others.

What is claimed is:

1. A communication apparatus using algorithm diversity comprising:
a plurality of demodulators;
recognizing means for recognizing a status of a used spreading factor of a spreading code; and
control means for controlling at least one demodulator leftover from said plurality of demodulators to demodulate data using a spreading code of relatively low spreading factor on the basis of the status of the used spreading factor.

2. The communication apparatus according to claim 1, wherein the recognizing means decides whether spreading factors of used spreading codes are all same or not.

3. The communication apparatus according to claim 1, wherein in the case where spreading factors of used spreading codes are different, the number of users assigned for a demodulator is decided.

4. The communication apparatus according to claim 1, wherein the control means selects a demodulation method at a leftover demodulator.

5. The communication apparatus according to claim 4, wherein a demodulation result of the best quality among modulation results is selected.

6. A mobile station communicating with the communication apparatus according to claim 1.

7. A communication system comprising:
the communication apparatus according to claim 1 and
a mobile station communicating with said communication apparatus.

8. The communication apparatus according to claim 1, wherein all demodulators of said plurality of demodulators are used in demodulation processing.

9. A communication apparatus using algorithm diversity comprising:
detecting means for detecting the quality of a reception data; and
control means for controlling a leftover demodulator to demodulate data of relatively low quality on the basis of the quality result.

10. The communication apparatus according to claim 9, wherein the control means decides whether the number of demodulators is the same as the number of users or not.

11. A communication system using algorithm diversity, wherein said algorithm diversity comprises:
recognizing status of a used spreading factor of a spreading code; and
controlling at least one demodulator leftover from a plurality of demodulators to demodulate data using a spreading code of relatively low spreading factor on the basis of the status of used spreading factor.

12. The communication system according to claim 11, wherein whether spreading factors of used spreading codes are all same or not is decided.

13. The communication system according to claim 11, wherein in the case where spreading factors of used spreading codes are different, the number of users assigned for a demodulator is decided.

14. The communication system according to claim 11, wherein a demodulation method at a leftover demodulator is selected.

15. The communication system according to claim 14, wherein a modulation result of the best quality among modulation results is selected.

16. The communication system according to claim 11, wherein all demodulators of said plurality of demodulators are used in demodulation processing.

17. A communication system using algorithm diversity, wherein said algorithm diversity comprising the steps of;
detecting the quality of a reception data; and
controlling a leftover demodulator to demodulate data of relatively low quality on the basis of the quality result.

18. The communication system according to claim 17, wherein whether the number of demodulators is the same as the number of users or not is decided.

* * * * *

UNITED STATES PATENT AND TRADEMARK OFFICE
CERTIFICATE OF CORRECTION

PATENT NO.   : 6,259,721 B1
DATED        : July 10, 2001
INVENTOR(S)  : M. Uesugi et al.

It is certified that error appears in the above-identified patent and that said Letters Patent is hereby corrected as shown below:

<u>Title page,</u>
Item [54], Title, "EQUIPMENT" should be -- APPARATUS --.

<u>Column 9,</u>
Line 61, "recognizing means for recognizing" should be -- a recognizing system that recognizes --.
Line 62, after "code;" delete "and".
Line 63, "control means for controlling" should be -- a controller that controls --.
Line 67, after "factor" insert:
   -- ; a selecting system that selects a second demodulation method different from a first demodulation method at the leftover demodulator; and
   a comparator that compares demodulation results of the first demodulation method and the second demodulation method. --

<u>Column 10,</u>
Line 2, "means decides" should be -- system determines --.
Line 3, after "same" delete "or not".
Line 25, "detecting means for detecting the" should be -- a detector that detects a --.
Line 27, "control means for controlling a leftover demodulator" should be -- a controller that controls at least one demodulator leftover from a plurality of demodulators --.
Line 29, after "result" insert:
   -- ; a selecting system that selects a second demodulation method different from a first demodulation method at the leftover demodulator; and
   a comparator that compares demodulation results of the first demodulation method and the second demodulation method. --
Lines 31-32, "the control means decides whether the number of demodulators is the same as the number of users or not" should be -- the controller decides whether a number of demodulators is the same as a number of users --.
Lines 9-10, "the control means selects a demodulation method at a leftover demodulator" should be -- the controller selects a demodulation method that provides superior demodulation results in association with on line conditions --.
Line 33, "system" should be -- method --.
Line 34, "wherein said algorithm diversity comprises" should be -- the method comprising --.
Line 35, after "recognizing" insert -- a --.
Line 36, after "code;" delete "and".

UNITED STATES PATENT AND TRADEMARK OFFICE
CERTIFICATE OF CORRECTION

PATENT NO. : 6,259,721 B1
DATED : July 10, 2001
INVENTOR(S) : M. Uesugi et al.

It is certified that error appears in the above-identified patent and that said Letters Patent is hereby corrected as shown below:

Column 10 cont'd,
Line 40, "of used spreading factor" should be:
-- of the used spreading factor; selecting a second demodulation method different from a first demodulation method at the leftover demodulator; and
comparing demodulation results of the first demodulation method and the second demodulation method --.
Lines 41-43, "system according to claim 11, wherein whether spreading factors of used spreading codes are all same or not is decided" should be
-- method according to claim 11, further comprising determining whether spreading factors of used spreading codes are all the same --.
Lines 44-47, "system according to claim 11, wherein in the case where spreading factors of used spreading codes are different, the number of users assigned for a demodulator is decided" should be -- method according to claim 11, further comprising determining the number of users assigned to a demodulator when spreading factors of used spreading codes are different --.
Line 57, "system" should be -- method --.
Line 58, "wherein said algorithm diversity comprising the steps of" should be -- the method comprising --
Line 59, "the" should be -- a --, and after "data;" delete "and".
Line 61, "the quality result" should be:
-- the detected quality;   selecting a second demodulation method different from a first demodulation method at the leftover demodulator; and
comparing demodulation results of the first demodulation method and the second demodulation method --.
Lines 62-64, "system according to claim 17, wherein whether the number of demodulators is the same as the number of users or not is decided" should be -- method according to claim 17, further comprising determining whether a number of demodulators is the same as a number of users --.
Lines 48-50, "system according to claim 11, wherein a demodulation method at a leftover demodulator is selected" should be:
-- method according to claim 11, further comprising selecting a demodulation method at a leftover demodulator that provides superior demodulation results in association with line conditions --.

UNITED STATES PATENT AND TRADEMARK OFFICE
CERTIFICATE OF CORRECTION

PATENT NO. : 6,259,721 B1
DATED : July 10, 2001
INVENTOR(S) : M. Uesugi et al.

It is certified that error appears in the above-identified patent and that said Letters Patent is hereby corrected as shown below:

<u>Column 10 cont'd,</u>
Lines 51-53, "system according to claim 14, wherein a modulation result of the best quality among modulation results is selected" should be -- method according to claim 14, further comprising selecting a modulation result having the best quality among modulation results of a same reception data --.

Signed and Sealed this

Sixteenth Day of July, 2002

Attest:

Attesting Officer

JAMES E. ROGAN
*Director of the United States Patent and Trademark Office*